May 18, 1943. W. T. HEDLUND 2,319,601
REFRIGERATION
Filed Oct. 1, 1938

INVENTOR.
William T. Hedlund
BY Ed Fenander
his ATTORNEY.

Patented May 18, 1943

2,319,601

UNITED STATES PATENT OFFICE 2,319,601

REFRIGERATION

William T. Hedlund, New Rochelle, N. Y., assignor to Servel, Inc., New York, N. Y., a corporation of Delaware Application October 1, 1938, Serial No. 232,697

14 Claims. (Cl. 62—5)

This invention relates to refrigeration, and more particularly to control of an absorption refrigeration system of the kind containing an auxiliary agent or pressure equalizing gas.

In absorption refrigeration systems of this type liquid refrigerant evaporates and diffuses into an auxiliary agent or inert gas in a cooling element or evaporator, thereby producing a refrigerating effect. The cooling element forms part of a gas circuit in which the resulting rich gas mixture of refrigerant and inert gas formed in the cooling element flows therefrom to an absorber, and gas weak in refrigerant flows from the absorber back to the cooling element. The absorber forms part of a liquid circuit in which absorption liquid becomes enriched with refrigerant in the absorber and flows therefrom to a generator. In the generator refrigerant is expelled from solution by heating, and the expelled refrigerant is condensed in a condenser and then conducted to the cooling element to complete the refrigerating cycle. The weakened absorption solution from which refrigerant has been expelled is conducted in the liquid circuit from the generator to the absorber to again absorb refrigerant gas.

It is an object of the invention to provide an improvement in a system of this type for controlling the refrigerating effect produced by the evaporator. This is accomplished by controlling the flow of gas in the gas circuit in response to a temperature condition affected by the cooling element. The cooling element is preferably of the flooded type whereby liquid refrigerant may be accumulated for the production of cold.

Another object of the invention is to control the circulation of gas in the gas circuit, and independently control the heat supply to the generator of the refrigeration system. The heat supply is preferably controlled in response to the temperature of the generator which in turn is dependent upon the concentration of the absorption solution therein. Even when normal heating of the generator is not effected to expel refrigerant out of absorption solution, sufficient heating is effected so that continuous circulation of absorption liquid in the liquid circuit will take place.

Figure 1:
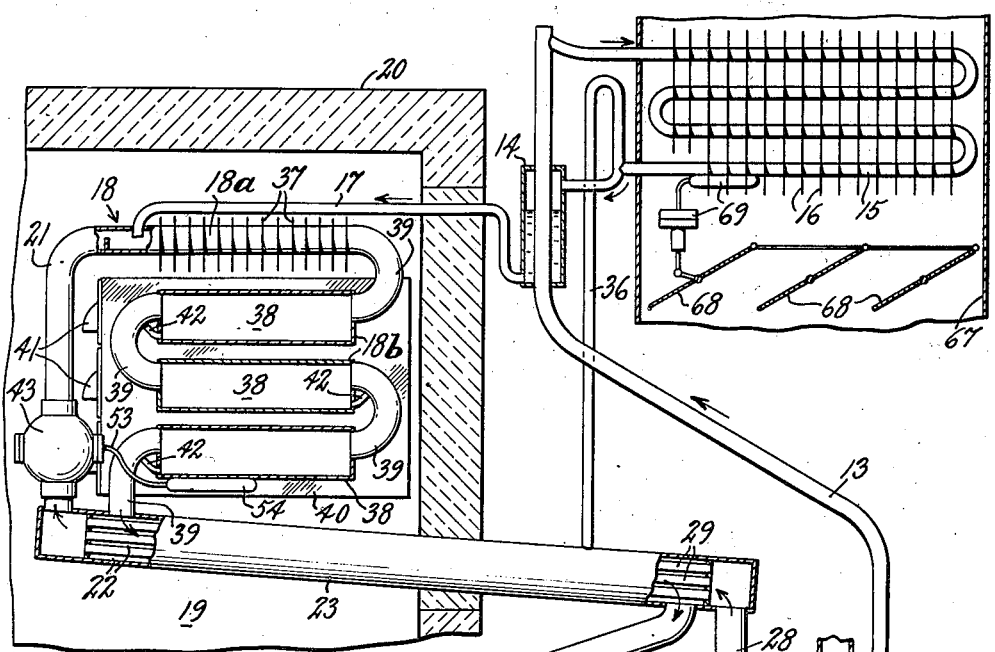
Figure 2:
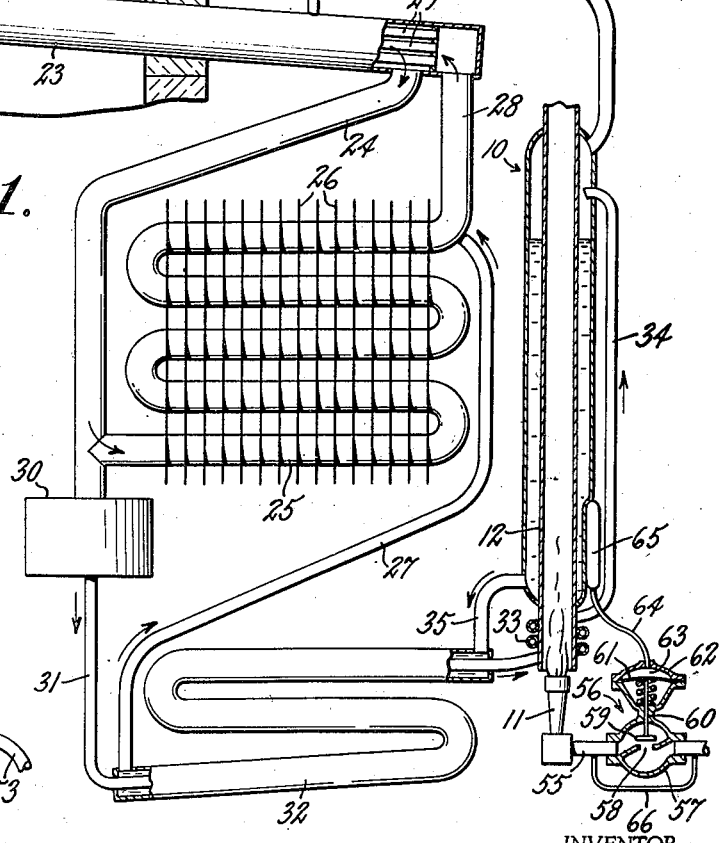

The above and other objects and advantages of the invention will become apparent from the following description and accompanying drawing forming a part of this specification, and of which Fig. 1 more or less diagrammatically illustrates a refrigeration system embodying the invention; and Fig. 2 is a sectional view of the thermostatically controlled valve shown in Fig. 1.

In the drawing the invention is embodied in an absorption refrigeration system of a uniform pressure type containing a pressure equalizing gas or auxiliary agent. A system of this type includes a generator 10 containing a refrigerant, such as ammonia, in solution in a body of absorption liquid, such as water. The generator 10 is heated in any suitable manner, as by a burner 11, for example, which projects its flame into the lower end of a flue 12.

By heating generator 10, refrigerant vapor is expelled out of solution and flows upward through conduit 13 to a liquid cooled rectifier 14 and thence into an air-cooled condenser 15 provided with a plurality of cooling fins 16. Water vapor accompanying refrigerant vapor is condensed in rectifier 14 and drains back to generator 10.

Refrigerant vapor condensed in condenser 15 flows into liquid cooled rectifier 14 and from the latter through a conduit 17 into the upper part of an evaporator or cooling element 18. The cooling element 18 is disposed in a space 19 having thermally insulated walls 20.

An inert gas, such as hydrogen, enters the upper part of cooling element 18 from a vertically extending conduit 21. Liquid ammonia evaporates and diffuses into the hydrogen with consequent absorption of heat from the surroundings of cooling element 18. The resulting rich gas mixture of ammonia and hydrogen flows from cooling element 18 through an outer passage 22 of a gas heat exchanger 23 and a conduit 24 into the lower end of an air-cooled absorber 25. The absorber 25 is diagrammatically shown in the form of a looped coil provided with a plurality of cooling fins 26.

In absorber 25 refrigerant gas is absorbed into absorption liquid which enters the upper part thereof through a conduit 27. The hydrogen, which is practically insoluble in absorption liquid and weak in refrigerant gas, is returned to the upper part of cooling element 18 through a conduit 28, a plurality of tubes 29 forming an inner passage of the gas heat exchanger, and conduit 21.

Absorption liquid enriched in refrigerant flows from absorber 25 into an accumulation vessel 30. From vessel 30 enriched liquid flows through a conduit 31 and the inner passage of a liquid heat exchanger 32 to a coil 33 disposed about the lower end of flue 12. Liquid is raised by vaporlift action from coil 33 through a conduit 34 into the upper part of generator 10. Absorption liquid weak in refrigerant flows from the lower part of generator 10 through a conduit 35, the outer passage of liquid heat exchanger 32, and conduit 27 into the upper part of absorber 25.

The lower end of condenser 15 is connected by a conduit 36 to the gas circuit, as at gas heat exchanger 23, for example. The conduit 36 extends upwardly from the lower end of the condenser and then downwardly and serves as a vent whereby any gas which passes through condenser 15 can flow into the gas circuit and not be trapped in the condenser.

The cooling element or evaporator 18 includes an upper section 18a and a lower section 18b. A plurality of heat transfer fins 37 are fixed to evaporator section 18a whereby this section is provided with a relatively extensive heat transfer surface and may be primarily employed for cooling space 19.

Refrigerant flowing through conduit 17 to evaporator section 18a is conducted from the latter to lower evaporator section 18b. Lower evaporator section 18b is of the flooded type and includes a plurality of vessels 38 which are located one above the other and connected in series and to the outer passage 22 of the gas heat exchanger by connecting bends or conduits 39.

The vessels 38 and connecting bends 39 may be arranged in thermal exchange relation with a casing or shell 40 forming a freezing unit. Such casing or shell may be formed with chambers adapted to receive trays 41 for freezing ice cubes and the like.

A small overflow conduit 42 is connected to the lower part of each vessel 38 and to a connecting bend 39. If the vessels 38 should contain absorption liquid, refrigerant flowing into the vessels settle on top of heavier absorption solution and presses the solution through overflow conduits 42 and into the connecting bends 39. In this manner absorption solution is removed from each vessel to the vessel beneath it and thence into gas heat exchanger 23, thereby purging the vessels 38 of absorption solution.

Conduit 21 is provided with valve structure 43 of the hermetically sealed type for controlling flow of gas in the gas circuit. Valve structure 43 may be of any suitable type and I do not wish to be limited to the particular structure illustrated. As shown, valve structure 43 includes a casing 44 having a partition 45 therein which is provided with a port or opening 46. A valve member 47 cooperates with opening 46 to control the flow of gas through the latter. The lower part of partition 45 is provided with an opening 48 which permits draining of liquid and also serves as a by-pass around valve member 47 when the latter is closed.

The valve member 47 is fixed to a stem 49 which is connected to an expansible and contractible bellows 50. A coil spring 51 is provided between valve member 47 and a part 52 of casing 44 to urge valve member 47 to its closed position. The bellows 50 is connected by a conduit 53 to a thermal bulb 54 which is arranged in thermal exchange relation with the bottom of lowest vessel 38. The bellows 50, conduit 53, and bulb 54 constitute an expansible fluid thermostat which is charged with a suitable volatile fluid. The fluid contained in the thermostat is hermetically sealed with respect to the fluid in the gas circuit. The volatile fluid increases and decreases in volume with corresponding changes in temperature to control valve member 47.

A suitable combustible gas is delivered to burner 11 through conduit 55 in which is connected a control valve 56. The control valve 56 shown is merely illustrative and any suitable control may be employed to control the flow of gas to burner 11. As shown, the control valve 56 includes a casing 57 having a partition provided with an opening or port 58 through which flow of gas is controlled by a valve member 59. Valve member 59 is provided with a stem 60 which is connected to a snap-acting diaphragm 61 secured to the upper part of the casing by a cover plate 62. The flexible diaphragm 60 and cover plate 62 define a chamber 63 which is connected by a conduit 64 to a thermal bulb 65. The thermal bulb 65 is arranged in thermal exchange relation with the lower part of generator 10.

The bulb 65, conduit 64, and chamber 63 also constitute an expansible fluid thermostat which is charged with a suitable volatile fluid to control valve member 59 and regulate flow of gas to burner 11. A small conduit 66 is connected around control valve 56 so that gas will always flow to burner 11 even when the main supply of gas past valve member 59 is shut off.

During operation of the refrigeration system gas circulates in the gas circuit including cooling element 18 and absorber 25, as explained above. The circulation of gas is due to the difference in specific weight of the rich mixture of hydrogen and refrigerant gas in cooling element 18, outer passage 22 of gas heat exchanger 23, and vertical conduit 24; and the weak mixture of hydrogen and refrigerant gas in absorber 25, conduit 28, inner passage 29 of the gas heat exchanger, and conduit 21. Due to this difference in specific weight of the columns of gas rich and weak in refrigerant gas, force is developed in the gas circuit for causing flow of rich gas toward absorber 25 and flow of weak gas toward cooling element 18.

The system operates as follows:

Assume that the temperature of the evaporator is low, for example, 5° F., and that the load on the refrigerator is low. Under this condition, valve 47 is closed or practically closed since the bulb 54 is at low temperature. Under this evaporator condition, let us assume that the average concentration of ammonia in solution is relatively high. High concentration of ammonia solution in generator 10 means a relatively low temperature since the greater the solution concentration, the lower the temperature at which ammonia can be driven off, other factors being constant. So, despite the fact that the gas circulation has been stopped, or substantially stopped, the heat continues to be applied to the generator and ammonia continues to be driven off. The ammonia vapor thus produced flows through conduit 13 to condenser 15 where it is liquefied and from which it flows to the evaporator 18. Here it accumulates since there is no total pressure difference between the condenser and the evaporator and since the flow of hydrogen into the evaporator has been reduced so that the vapor pressure above liquid ammonia in the evaporator is of such high value for the existing temperature that no appreciable amount of ammonia can evaporate. In other words, the evaporator is filled with gas rich in ammonia which blankets evaporation. Thus a quantity of liquid ammonia is stored in the evaporator for ready use on demand for refrigeration.

In this process of continued ammonia expulsion without evaporation, the average concentration of ammonia solution in the generator-absorber circuit is being decreased because of expulsion in the generator without absorption in the absorber. Absorption has also been stagnated by the stoppage in the hydrogen circulation circuit. It is only necessary to close or restrict one branch of the gas circuit for this purpose since transfer of ammonia by diffusion is slow and ineffective. Therefore the fact that conduits 28, 39 and the connecting space of the gas heat exchanger leave an open communication between the evaporator and the absorber does not defeat the purpose.

As the ammonia is driven from solution without substantial absorption, the temperature of the generator rises, approaching the boiling point of pure water at the prevailing pressure determined by the temperature of the condenser. When the temperature of the generator rises to a given value, the heating of bulb 65 causes decrease of valve opening of valve 59 thus decreasing the supply of heat to the generator. At this time the full complement of transferable ammonia has been transferred to the evaporator and the pockets or vessels 38 of the evaporator are essentially filled. This condition may continue for some time, that is, with the heat supply reduced to minimum and with the gas circuit closed. The valve structure 56 should be so constructed that there is always enough heat to cause some circulation between the generator and the absorber. In the embodiment shown this is effected by the by-pass 66. Instead of providing by-pass 66, control valve 56 may be so constructed that valve member 59 will not completely close but permit reduced flow of gas to burner 11.

Assume, now, that a load is placed on the refrigerator as, for example, by opening the door of the refrigerator, removing the ice and refilling trays with relatively warm water to be made into ice. The evaporator temperature may suddenly rise from, say 5° F. to 20° F. Assuming that valve 43 operates between 5° F. and 10° F., this will cause full opening of valve member 47, thus starting full gas circulation in the circuit between the absorber and the evaporator. We now have the advantages for a quick temperature "pull down" that there is an adequate quantity of liquid in all parts of the evaporator so that every part of the evaporator can be immediately effective, and that the absorber solution has been weakened to a maximum so that rapid absorption can take place and the weak gas leaving the absorber can have a low ammonia partial pressure, thus facilitating rapid evaporation in the evaporator when the weak gas enters the same. This permits rapid ice freezing and quick lowering of evaporator and food space temperature.

As the concentration of solution in the generator-absorber circuit increases due to absorption, the generator temperature lowers because ammonia can be expelled at lower temperature. The system has previously wanted to lower generator temperature but this has been prevented by the weakness of the solution. The lowering of generator temperature causes increase of heat supply and then ammonia vapor is driven off in quantity, condensed, and the liquid ammonia flows to the evaporator.

When the evaporator temperature has again dropped sufficiently, valve member 47 again closes. Heating continues until the concentration of the solution is again reduced to cause the generator temperature to rise to the point where valve 59 is closed or reduced to give minimum heat supply.

Thus it will be seen that my system is more flexible than known systems of this type and that I utilize periods of low load to provide liquid refrigerant accumulation and extended depletion of refrigerant solution to give greater capacity for quickly taking care of a following peak in demand for cooling effect.

If desired, the condenser 15 may be operated at constant or substantially constant temperature in order to more definitely predetermine the relation between heat supply and solution concentration. To this end the condenser may be placed in a flue 67 controlled by dampers 68 movable in response to condenser temperature by means of a thermostat 69 to close, open and vary the flue cross-section so as to maintain constant condenser temperature. Obviously, the condenser may be maintained at constant temperature by other known expedients such as cooling the same by cooling water and controlling the flow of cooling water in response to condenser temperature, for instance, the water outlet at the condenser.

The opening 48 in valve structure 40 may be of any size. This opening may be very small so that gas circulation is substantially stopped when valve member 44 is closed. The high and low temperature values at which valve member 59 closes and opens are dependent upon the snap-action of flexible diaphragm 61. Any suitable mechanism may be employed to increase and reduce the heat supply to generator 10 within a predetermined temperature range.

While a single embodiment of the invention has been shown and described, such variations and modifications are contemplated as fall within the true spirit and scope of the invention, as pointed out in the following claims.

What is claimed is:

1. In the process of refrigerating by means of a system containing refrigerant, absorption liquid and inert gas and in which there is a major circuit for circulation of refrigerant through a generator, a condenser, an evaporator and an absorber, a local circuit for circulation of absorption liquid between the absorber and generator, and a local circuit for circulation of inert gas between the evaporator and absorber, the improvement which consists in uninterruptedly feeding to the evaporator refrigerant condensed in the condenser substantially as supplied thereto from the generator, automatically varying the circulation of inert gas during normal operation in response to temperature produced by the evaporator and, at times of diminished inert gas circulation, accumulating liquid refrigerant in the gas circuit for subsequent evaporation.

2. In the process of refrigerating by means of a system containing refrigerant, absorption liquid and inert gas and in which there is a major circuit for circulation of refrigerant through a generator, a condenser, an evaporator and an absorber, a local circuit for circulation of absorption liquid between the absorber and generator, and a local circuit for circulation of inert gas between the evaporator and absorber, the improvement which consists in automatically varying inert gas flow in direct response to variations of condition of the objective of refrigeration and automatically varying absorption liquid flow in response to variations of concentration of absorption liquid.

3. In a refrigeration system of the absorption type, an evaporator adapted to hold a relatively large quantity of liquid refrigerant, an absorber, conduits connecting said evaporator and said absorber for circulation of inert gas, a closure in one of said conduits, and automatic means to control said closure in response to evaporator temperature.

4. In a refrigeration system of the absorption type, an evaporator adapted to hold a relatively large quantity of liquid refrigerant, an absorber, conduits connecting said evaporator and said absorber for circulation of inert gas, a closure in one of said conduits, means to control said closure in response to evaporator temperature, a generator, conduits connecting said absorber and generator for circulation of absorption liquid, means to heat said generator, and means to decrease heating of the generator when the concentration of absorption liquid is decreased to a given value.

5. In a refrigeration system having a circuit including an evaporator and an absorber for circulation of an inert gas, and conduit means to conduct liquid refrigerant to the evaporator, said evaporator being formed and arranged to accumulate liquid refrigerant, a device in said inert gas circuit for controlling circulation of gas therein, means responsive to a temperature condition affected by the evaporator to operate said device to increase circulation of inert gas on rise of temperature and decrease circulation of gas on fall of temperature, and means to feed liquid refrigerant to the evaporator independently of said circulation controlling device.

6. In an absorption refrigerating system having a generator, a condenser, an absorber, an evaporator, a heater for the generator, and conduit means connecting the aforementioned parts to provide a circuit for circulation of absorption liquid between the generator and the absorber, a circuit for circulation of cooling agent through the generator, condenser, evaporator and absorber, including means to feed liquid cooling agent from the condenser to the evaporator, and a circuit for circulation of an inert gas between the absorber and the evaporator, a device in the inert gas circuit for controlling the circulation of gas therein responsive to a temperature condition affected by the evaporator to increase circulation of inert gas on rise of said temperature condition and decrease circulation of inert gas on fall of said temperature condition, and control means responsive to a temperature condition affected by the generator for controlling said heater, the means for feeding liquid cooling agent to the evaporator being independent of the device for controlling flow of inert gas.

7. The combination defined in claim 6 in which the control means for the heater reduces the supply of heat to the generator upon rise of temperature to a predetermined high value and increases the supply of heat to the generator upon fall of temperature to a predetermined lower value.

8. In an absorption refrigerating system having a generator, a condenser, an absorber, an evaporator, a heater for the generator, and conduit means connecting the aforementioned parts to provide a circuit for circulation of absorption solution between the generator and the absorber, a circuit for circulation of refrigerant through the generator, condenser, evaporator and absorber, and a circuit for circulation of an inert gas between the absorber and the evaporator, said evaporator being formed and arranged to accumulate refrigerant, valve means responsive to a temperature condition affected by the evaporator for controlling the circulation of gas in the inert gas circuit to increase circulation of inert gas on rise of said temperature condition and decrease circulation of inert gas on fall of said temperature condition, and means independent of said last-mentioned means to decrease the heat supplied to the generator by the heater when a definite quantity of liquid refrigerant is withdrawn out of circulation at the evaporator and the average concentration of the absorption solution falls below a predetermined value.

9. In a refrigeration system having a circuit for circulation of inert gas including an evaporator and an absorber and conduit means to conduct liquid refrigerant to the evaporator, said evaporator being formed and arranged to accumulate liquid refrigerant, a valve directly in said inert gas circuit for controlling circulation of gas therein, and means responsive to a temperature condition affected by the evaporator to increase the opening of said valve on rise of temperature and to decrease the opening of said valve on fall of temperature.

10. In a refrigeration system having a generator, a condenser, an evaporator, an absorber, conduits connecting the aforesaid parts to form a system for circulation of refrigerant, inert gas and absorption liquid, said system including means to uninterruptedly feed refrigerant from the generator to the condenser and to uninterruptedly feed liquefied refrigerant from the condenser to the evaporator, said evaporator being constructed to accumulate liquid refrigerant therein, means operating automatically in accordance with variations of load on the system for circulating inert gas through and between the evaporator and absorber, a heater for said generator, and means to automatically control the heater in accordance with the concentration of absorption solution in the generator.

11. In a refrigeration system having a generator, a condenser, an evaporator, an absorber, conduits connecting the aforesaid parts to form a system for circulation of refrigerant, inert gas and absorption liquid, said system including means to uninterruptedly feed refrigerant from the generator to the condenser and to uninterruptedly feed liquefied refrigerant from the condenser to the evaporator, said evaporator being constructed to accumulate liquid refrigerant therein, means operating automatically in accordance with variations of load on the system for circulating inert gas through and between the evaporator and absorber, a heater for said generator, means to automatically control the heater in accordance with the concentration of absorption solution in the generator, and means to provide substantially constant temperature cooling for the condenser.

12. In an absorption refrigeration system employing auxiliary inert fluid, refrigerant fluid, and an absorbent for the refrigerant fluid, a circuit for the inert fluid including an evaporator and an absorber, a still for delivering liquefied refrigerant fluid to said evaporator and connected to receive enriched absorbent from said absorber and supply weakened absorbent thereto, a device for varying rate of flow of fluid in said circuit responsive to demand for refrigeration, and a second device for controlling operation of said still responsive to a temperature condition thereof.

13. In an absorption refrigeration system employing auxiliary inert fluid, refrigerant fluid, and an absorbent for the refrigerant fluid, a circuit for the inert fluid including an evaporator and an absorber, a still for delivering liquefied refrigerant fluid to said evaporator and absorbent to said absorber, a device for varying rate of flow of fluid in said circuit responsive to a temperature condition pertinent to operation of the system, and a second device for controlling operation of said still responsive to a second condition pertinent to operation of the system other than a temperature condition affected by said evaporator.

14. An asorption refrigeration system employing auxiliary inert gas, refrigerant fluid, and liquid absorbent for the refrigerant fluid, and having a circuit for the inert gas including an evaporator and an absorber, a still for delivering liquefied refrigerant fluid to said evaporator and connected to receive enriched absorbent from said absorber and supply weakened absorbent thereto, a device for varying rate of flow of gas in said circuit responsive to a temperature condition affected by said evaporator, and a second device operative to control operation of said still to keep said evaporator supplied with liquid refrigerant and said absorber supplied with weakened liquid absorbent independently of said varying rate of flow of gas in said circuit.

WILLIAM T. HEDLUND.